United States Patent
Cancellieri et al.

(10) Patent No.: US 7,254,014 B2
(45) Date of Patent: Aug. 7, 2007

(54) DISPLAY ASSEMBLY

(75) Inventors: Jude Cancellieri, Spring Valley, NY (US); Chester J. Poch, Pompton Lakes, NJ (US)

(73) Assignee: Honeywell International, Inc., Morristown, NJ (US)

(\*) Notice: Subject to any disclaimer, the term of this patent is extended or adjusted under 35 U.S.C. 154(b) by 265 days.

(21) Appl. No.: 11/011,945

(22) Filed: Dec. 15, 2004

(65) Prior Publication Data

US 2005/0128691 A1 Jun. 16, 2005

Related U.S. Application Data

(60) Provisional application No. 60/529,097, filed on Dec. 15, 2003.

(51) Int. Cl.
*G06F 1/16* (2006.01)
(52) U.S. Cl. .................................................. 361/681
(58) Field of Classification Search ................ 361/681; 248/917; 348/794; 349/58
See application file for complete search history.

(56) References Cited

U.S. PATENT DOCUMENTS

| 5,973,922 | A | * | 10/1999 | Kamphuis | 361/704 |
| 6,064,453 | A | * | 5/2000 | Inubushi et al. | 349/58 |
| 7,012,655 | B2 | * | 3/2006 | You et al. | 349/12 |

\* cited by examiner

*Primary Examiner*—Yean-Hsi Chang
(74) *Attorney, Agent, or Firm*—Ingrassia Fisher & Lorenz (57) ABSTRACT

A mounting apparatus for a display comprises a plate configured to hold a source of light for a display, a first housing sealingly connected to the plate, and a second housing sealingly connected to the plate. The plate has a first side, a second side, and a peripheral edge. The second side is opposite the first side. The first housing and the first side of the plate cooperate to form a first substantially gas-tight seal proximate the peripheral edge. The second housing and the second side of the plate cooperate to form a second substantially gas-tight seal proximate the peripheral edge. The second housing includes a flange extending over at least a portion of the peripheral edge and beyond a plane of the first side of the plate. The flange is separated from the first housing by a gap such that the first and second seals can be formed.

16 Claims, 6 Drawing Sheets

DISPLAY ASSEMBLY

CROSS-REFERENCE TO RELATED APPLICATION

This application claims the benefit of U.S. Provisional Application No. 60/529,097, filed on Dec. 15, 2003, which is incorporated herein by reference in its entirety.

FIELD

This invention relates to an assembly for a display and, more particularly, to an assembly for providing a substantially gas-tight seal for housing a display.

INTRODUCTION

Modern vehicles often incorporate one or more displays to provide information to the operator. For example, modern aircraft may include one or more displays for the pilot. In order to protect these displays from the environment or Electro-Magnetic Interference ("EMI"), they are often sealed within an assembly. For example, aircraft displays are often sealed in what are referred to as display head assemblies ("DHA").

One type of display used in aircraft is a liquid crystal display ("LCD"). However, an LCD does not generate its own light. Instead, an LCD uses an external source of light, such as a backlight, to make information on the screen visible. Typically, the greater the luminance or brightness of the source of light, the easier it is to view the LCD.

Unfortunately, the greater the luminance of the source of light, the more heat it generates. Since a display in an aircraft is often sealed, the heat generated by the display may dissipate slowly or become trapped within the assembly. Therefore, known display assemblies that are sealed must use a low luminance in order to avoid overheating. This causes most known displays, such as DHAs installed in aircraft, to appear dim.

It would therefore be desirable to provide an assembly that can protect a display from the environment and EMI, and also efficiently remove heat generated by the display such that it can operate at a higher luminance.

SUMMARY

In accordance with various aspects of the invention, a mounting apparatus for a display comprises a plate configured to hold a source of light for a display, a first housing sealingly connected to the plate, and a second housing sealingly connected to the plate. The plate has a first side, a second side, and a peripheral edge. The second side is opposite the first side. The first housing and the first side of the plate cooperate to form a first substantially gas-tight seal proximate the peripheral edge. The second housing and the second side of the plate cooperate to form a second substantially gas-tight seal proximate the peripheral edge. The second housing includes a flange extending over at least a portion of the peripheral edge and beyond a plane of the first side of the plate. The flange is separated from the first housing by a gap such that the first and second seals can be formed.

In accordance with another aspect of the present invention, a display head assembly includes a display and a metal structure configured to mount a source of light for the display. The metal structure has a first side, a second side, and a peripheral edge. The assembly also includes a first metal housing in direct contact with the first side of the metal structure to cooperatively form a first continuous seal proximate the peripheral edge and a second metal housing in direct contact with the second side of the metal structure to cooperatively form a second continuous seal proximate the peripheral edge. A flange extends from the second housing, over at least a portion of the peripheral edge, and beyond a plane of the first side of the metal structure. The flange is separated from the first housing by a gap such that the first and second seals can be formed.

In accordance with another aspect of the present invention, a mounting assembly for a display comprises a plate configured to hold a source of light for a display. The plate has a first side, a second side, and a peripheral edge, wherein the second side is opposite the first side. The plate further includes a plurality of clearance holes extending through the plate from the first side to the second side. The assembly includes a first housing configured to be sealingly connected to the first side of the plate and a second housing configured to be sealingly connected to the second side of the plate. The second housing includes a plurality of through holes. The assembly also includes at least one first fastener. Each of the first fasteners extends through one of said clearance holes and is received by a threaded region of the first housing. The first fastener is configured to urge the plate and the first housing toward one another to form a first substantially gas-tight seal between the first housing and the plate proximate the peripheral edge. The assembly includes at least one second fastener. Each of the second fasteners extends through one of said through holes and one of said clearance holes and is received by a threaded region of the first housing. The second fastener is configured to urge the first and second housings toward one another and sandwich the plate therebetween to form a second substantially gas-tight seal between the second housing and the plate proximate the peripheral edge.

BRIEF DESCRIPTION OF THE DRAWINGS

The accompanying drawings, which are incorporated in and constitute a part of this specification, illustrate the invention and together with the description, serve to explain principles of the invention.

The features of the invention will now be set forth in part in the description which follows, and in part will be obvious from the description, or may be learned by practice of the invention. Both the foregoing general description and the following detailed description are exemplary and explanatory only and are not restrictive of the invention.

DESCRIPTION OF THE EMBODIMENTS

Assemblies configured in accordance with the present invention provide a sealed housing for a display that protects the display from EMI and the environment and also efficiently removes heat from the display. The assembly comprises one or more housings that enclose the display. For example, for an LCD-type display in a DHA for an aircraft, the source of light for the LCD is mounted on a plate within the assembly. The plate may then be sandwiched between the housings of the assembly. The housings and plate are sealed together to protect the display from the environment and/or EMI. In addition, the seal may also provide a heat transfer path for cooling the assembly and allowing the display to operate, for example, at a higher luminance.

Reference will now be made in detail to the features of the invention, an example of which is illustrated in the accompanying drawings. Wherever possible, the same reference numbers will be used throughout the drawings to refer to the same or like parts.

Figure 1:
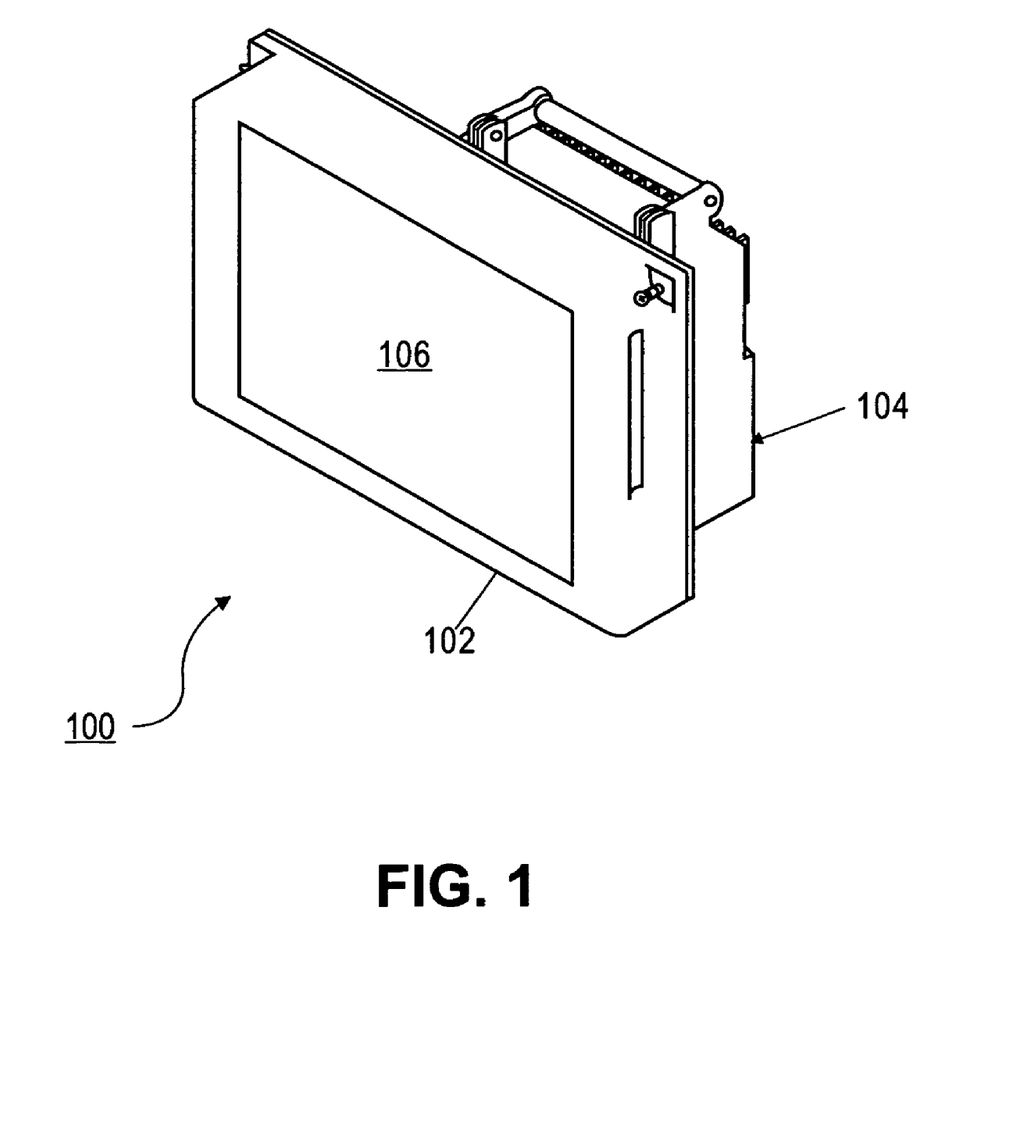
FIG. 1 is a front overhead isometric view of an exemplary assembly in accordance with various aspects of the invention.

FIG. 1 shows a front overhead view of an exemplary assembly that is configured in accordance with principles of the present invention. As shown, an exemplary assembly 100 configured to house a display may include a first housing 102 and a second housing 104 configured to enclose a display 106. The first and second housings 102, 104 may comprise, for example, front and rear housings.

First housing 102 can be configured to receive display 106 and to enclose at least a portion of the viewable side of display 106, such as the side that faces toward a user or pilot. In various embodiments, display 106 may be mounted to front housing 102 using, for example, screws or any other fastening mechanism known to those skilled in the art (not shown). In addition, first housing 102 may include an opening or a transparent surface, such as a glass window, for allowing a pilot or user to view display 106. First housing 102 may be constructed of various materials. For example, first housing 102 may be made of a metal, such as, for example, steel or aluminum.

Display 106 provides information to the user, such as a pilot. For example, display 106 may be an active matrix LCD ("AMLCD"). However, display 106 may be any type of display.

Figure 2:
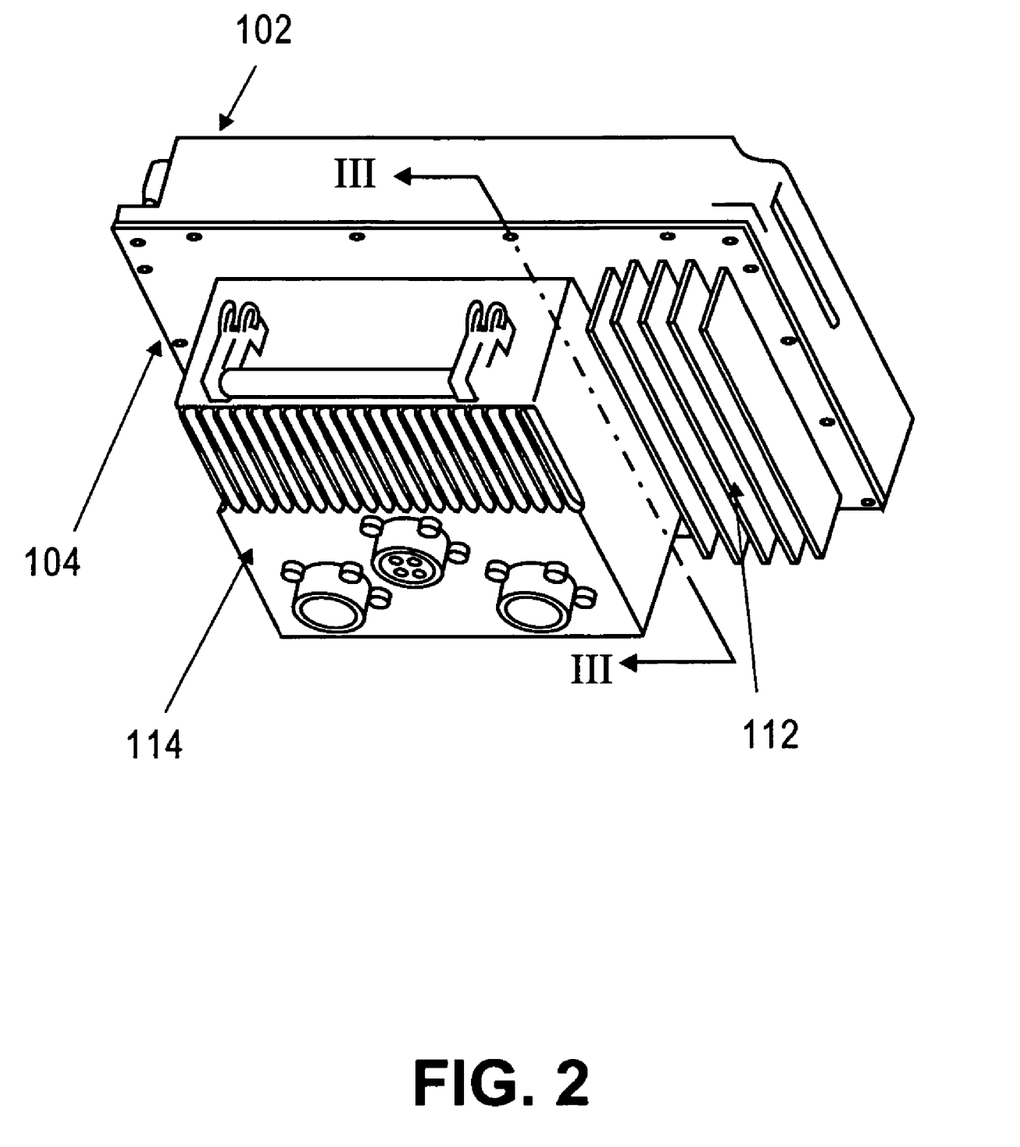
FIG. 2 is a rear overhead isometric view of the assembly of FIG. 1.

FIG. 2 shows a rear overhead view of assembly 100 that is configured in accordance with principles of the present invention. As shown, second housing 104 may include cooling fins 112 and an electronics housing 114 for housing the display electronics of display 106. Thus, second housing 104 may enclose the side of display 106 that faces away from a user or pilot, such as the side that faces toward the nose of an aircraft. Second housing 104 may be constructed of various materials, such as, for example, steel or aluminum.

Cooling fins 112 can provide a surface area for removing heat from assembly 100, such as heat generated by display 106. Cooling fins 112 may be configured in a variety of ways to maximize the amount of heat dissipated. For example, as shown in FIG. 2, cooling fins 112 may comprise a series of rectangular fins attached to second housing 104. However, one skilled in the art would recognize that cooling fins 112 may be constructed in a variety of shapes and sizes in order to maximize the heat dissipated, as would be understood by a person skilled in the art.

Electronics housing 114 can enclose electronics for display 106 and can provide one or more interfaces for display 106. For example, as shown, electronics housing 114 may include one or more connectors for connecting display 106 to other devices.

Figure 3:
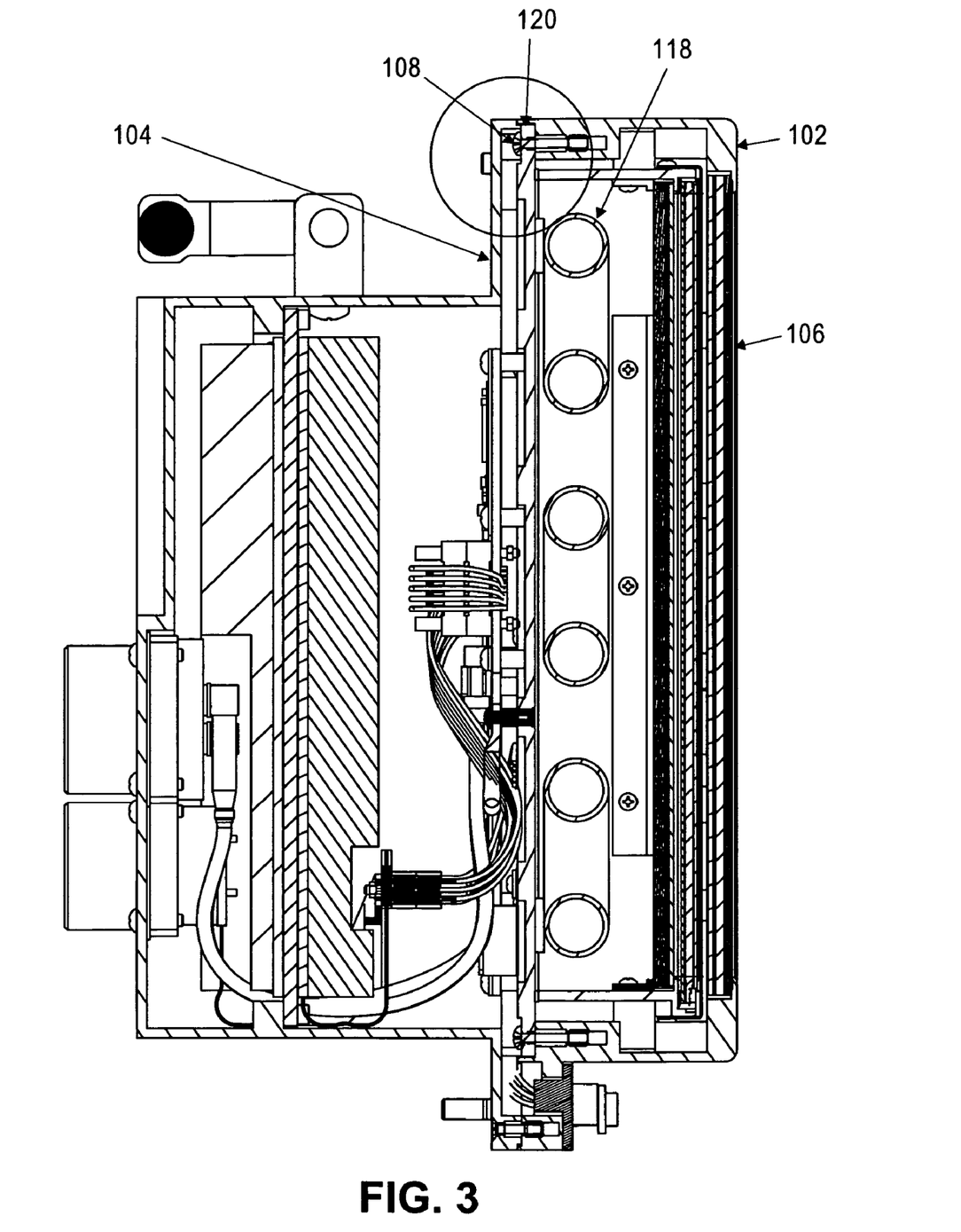
FIG. 3 is a cross-sectional side view of the exemplary assembly taken along line III-III of FIG. 2.

FIG. 3 shows a side view of assembly 100 that is configured in accordance with principles of the present invention. As shown, assembly 100 includes a mounting plate 120, which is sandwiched between first housing 102 and second housing 104. The exemplary assembly 100 in FIG. 3 can be held together, at least in part, by one or more fasteners 108. The fastener 108 may comprise, for example, a screw. The fastener 108 can secure mounting plate 120 to first housing 102. The installation and functionality of fastener 108 is further illustrated and described below with reference to FIG. 4.

FIG. 3 further illustrates a lamp 118, which can serve as a source of light for display 106. For example, lamp 118 may be configured as a serpentine lamp and may operate as a backlight for display 106. However, one skilled in the art would recognize that lamp 118 may be located in other positions relative to display 106, such as along one side of display 106. According to various embodiments, mounting plate 120 can provide a structure for mounting lamp 118. Mounting plate 120 may be constructed of various materials, such as, for example, steel or aluminum.

Figure 4:
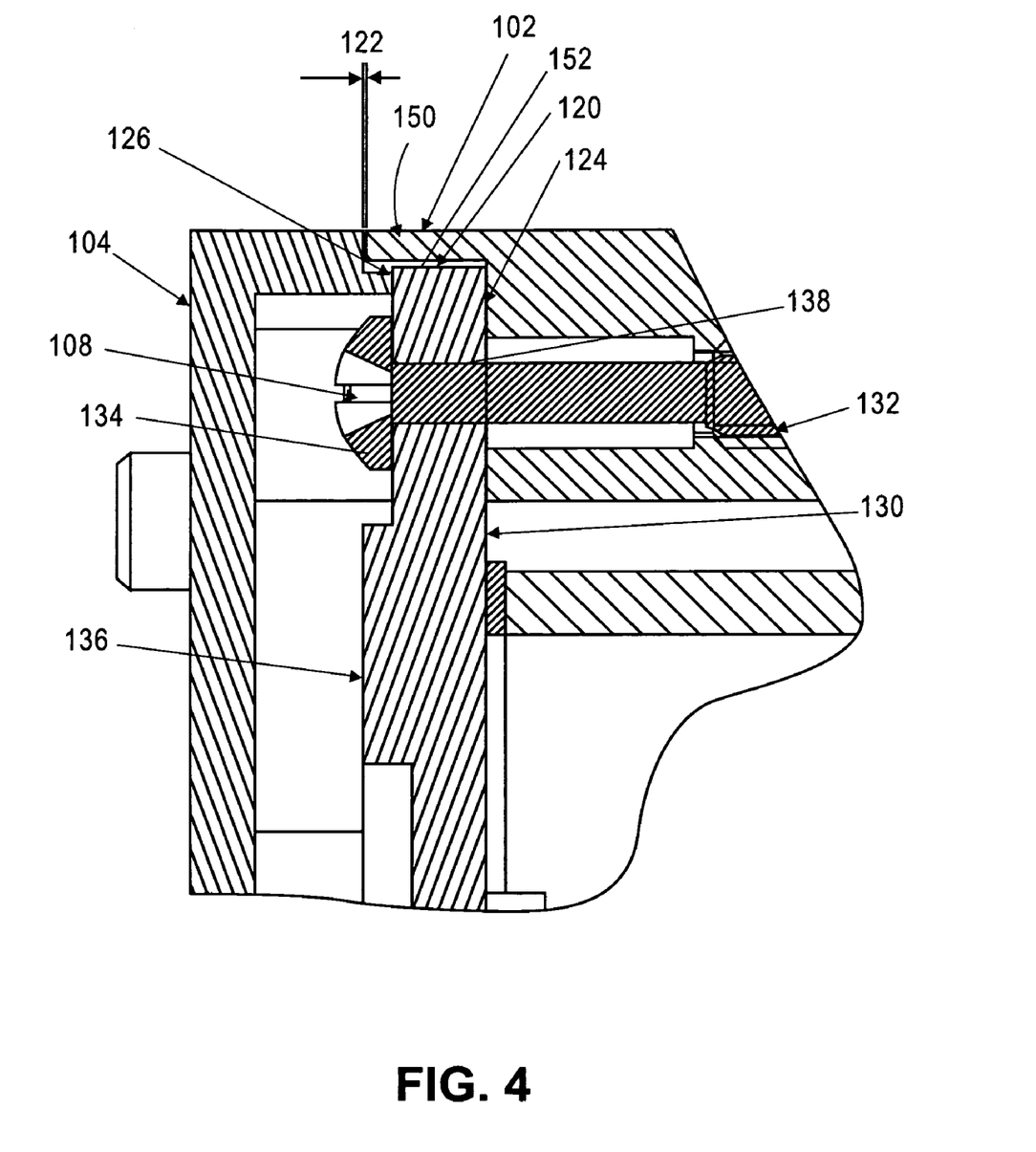
FIG. 4 is a cross-sectional side view of a portion of the assembly of FIG. 1.

FIG. 4 shows a more detailed side view of assembly 100 that is configured in accordance with the present invention. As shown, mounting plate 120 can be sandwiched between first housing 102 and second housing 104. As shown in the exemplary embodiment of FIG. 4, a first side 130 of mounting plate 120 can be held in direct contact with first housing 102. That is, assembly 100 may avoid use of a gasket or other resilient material in connecting first housing 102 with mounting plate 120.

According to various embodiments, mounting plate 120 can include one or more clearance holes 138 sized and arranged to receive one or more fasteners 108. Each fastener 108 can traverse through mounting plate 120 via clearance hole 138 and seat into first housing 102. For example, first housing 102 can include a threaded region 132 aligned with clearance hole 138. Fastener 108, for example, a threaded fastener, can be inserted through clearance hole 138 and into threaded region 132 and threadedly connected to first housing 102. As a result, a head portion 134 of fastener 108 can cooperate with the threaded connection to fasten first housing 102 to mounting plate 120 in a manner that prevents vibration between them.

Figure 5:
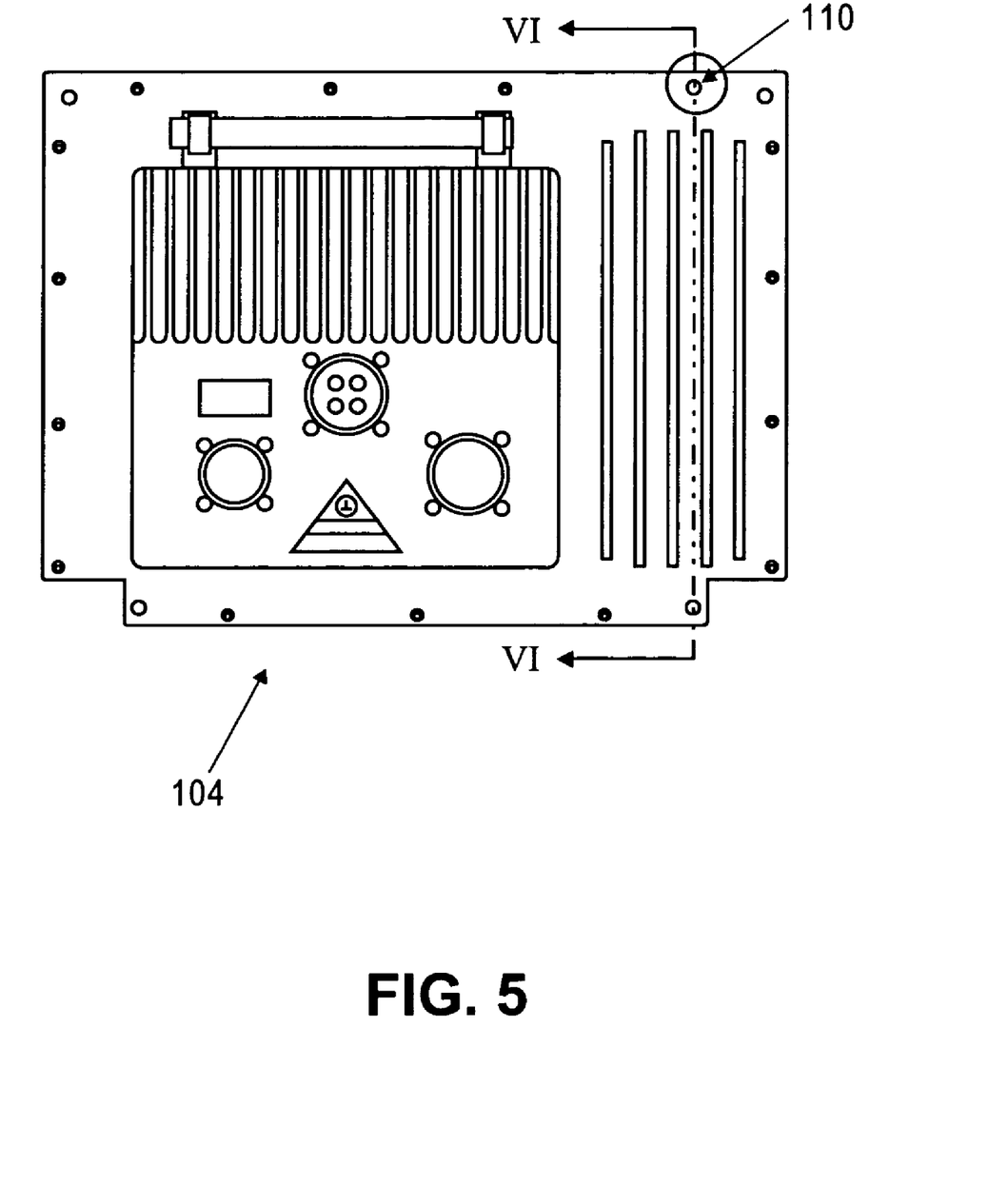
FIG. 5 is a rear view of the assembly of FIG. 1.

FIG. 5 shows a rear view of assembly 100 that is configured in accordance with principles of the present invention. FIG. 5 shows how one or more fasteners 110, such as a screw, may be used to connect second housing 104 with a second side 136 (FIGS. 4 and 6) of mounting plate 120.

Figure 6:
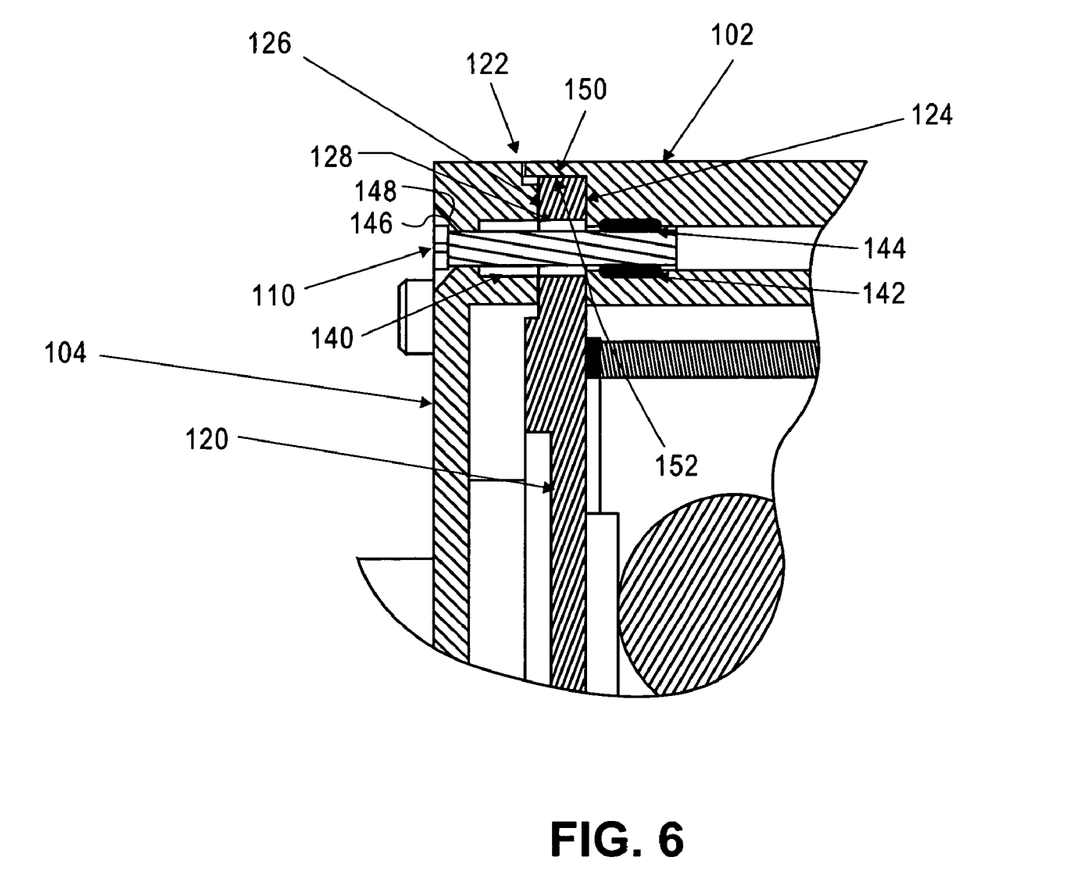
FIG. 6 is a cross-sectional side view of a portion of the exemplary assembly taken along line VI-VI of FIG. 5.

FIG. 6 shows a detailed side view of assembly 100 that is configured in accordance with the present invention. FIG. 6 shows one example of how first housing 102, second housing 104, and mounting plate 120 may be connected together by a fastener 110, for example, a screw. For example, fastener 110 may extend through a throughbore 140 in second housing 104, through a clearance hole 128 in mounting plate 120, and into a threaded region 142 of first housing 102. Although FIG. 6 illustrates the use of screws, any manner of sealing assembly 100 know to those skilled in the art may be used in accordance with the principles of the present invention. For example, assembly 100 may also be sealed together with glue.

A threaded portion 144 of fastener 110 can be threaded through throughbore 140 and then slid through clearance hole 128. Fastener 110 traverses mounting plate 120 via clearance hole 128, and can be threadedly connected to threaded region 142 of first housing 102. A tapered head portion 146 of fastener 110 can seat against a tapered portion 148 of throughbore 140 and cooperate with the threaded connection to fasten second housing 104 to mounting plate 120 and first housing 102 in a manner that prevents vibration between them. Thus, use of a gasket or other resilient seal can be avoided.

The assembly 100 may include a flange or lip 150 extending from first housing 102 over a peripheral edge 152 of mounting plate 120. The flange 150 can extend beyond second side 136 of mounting plate 120. Flange 150 and housing 102 can be a single piece of unitary construction, or they can be separate elements assembled together. The flange 150 helps prevent any contaminants from getting into the box, such as water, humidity, salt fog, and the like. Instead, these contaminants stay on the outside of the flange 150 and external to all the electronics within the housings 102, 104.

To help ensure that first housing 102 forms a continuous, sealed connection with first side 130 of mounting plate 120 and that second housing 104 forms a continuous, sealed connection with second side 136 of mounting plate 120, the first and second housings 104 may be configured to provide a design gap 122. That is, even though flange 150 can extend beyond second side 136 of mounting plate 120 in the direction of second housing 104, the first and second housing 102, 104 do not contact one another. As a result, design gap 122 ensures that first housing 102 can directly contact mounting plate 120 at a front interface 124 and that second housing 104 can directly contact mounting plate 120 at a rear interface 126. Accordingly, rear interface 126 in conjunction with front interface 124 may form continuous seals proximate peripheral edge 152 of mounting plate 120 that protects display 106 from environmental factors, such as dirt or moisture, or from EMI. The continuous seals may comprise substantially gas-tight seals.

It should be appreciated that if mounting plate 120 and first and second housings 102, 104 are each constructed of metal, each of the interfaces 124, 126 may comprise a metal-to-metal seal. Thus, assembly 100 may be sealed without gaskets and instead rely on direct contact between front housing 102, rear housing 104, and mounting plate 120. Such as assembly 100 may eliminate the need to continually replace worn out gaskets. However, assembly 100 may also include one or more gaskets to assist in protecting display 106, for example, from vibration. For example, assembly 100 may include a gasket between front assembly 102 and mounting plate 120, or in some other location.

In addition, front interface 124 and rear interface 126 may provide a metal-to-metal contact area that can serve as an additional heat-transfer path for removing heat from assembly 100. For example, heat generated by lamp 118 may be transferred by conduction to mounting plate 120. The heat may then travel, for example, heat through front interface 124 into front housing 102 and dissipate. Likewise, heat from lamp 118 may conduct through rear interface 126 into rear housing 104. Rear housing 104 may then dissipate the heat through cooling fins 112 by natural convection to the surrounding ambient air. Therefore, in addition to serving as an environmental or EMI seal, front interface 124 and rear interface 126 may also serve as a heat-transfer path.

Accordingly, although assembly 100 can provide a sealed enclosure for display 106, the manner in which assembly 100 is sealed may also allow assembly 100 to efficiently dissipate heat, such as the heat generated by lamp 118. Therefore, display 106 may operate at a higher luminance and at a longer operating life.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Other features and embodiments of the invention will be apparent to those skilled in the art from consideration of the specification and practice of the invention disclosed herein. It is intended that the specification and examples be considered as exemplary only, with a true scope and spirit of the invention being indicated by the following claims. For example, although an assembly for display in an aircraft is described in the specification, one skilled in the art would recognize that the present invention may be used in other types of environments, such as in automobiles or ships.

What is claimed is:

1. A mounting apparatus for a display, comprising;
    a plate configured to hold a source of light for the display, the plate having a first side, a second side, and a peripheral edge, the second side being opposite the first side;
    a first housing sealingly connected to the plate, the first housing and the second side of the plate cooperating to form a first substantially gas-tight seal proximate the peripheral edge, the first housing including a flange extending over at least a portion of the peripheral edge and beyond a plane of the first side of the plate;
    a second housing sealingly connected to the plate, the second housing and the first side of the plate cooperating to form a second substantially gas-tight seal proximate the peripheral edge;
    at least a first fastener extending through the plate and threadably coupled to the first housing, the first fastener sealing the first housing to the plate; and
    at least a second fastener extending through the second housing and the plate and threadably coupled to the first housing, the second fastener sealing the second housing to the plate;
    wherein the flange is separated from the second housing by a gap such that the first and second seals can be formed.

2. The mounting apparatus of claim 1, wherein the plate transfers heat from the source of light to at least one of the first and second housings via the first and second continuous seals.

3. The mounting apparatus of claim 1, wherein the plate, the first housing, and the second housing are constructed of metal.

4. The mounting apparatus of claim 1, wherein the first and second seals comprise gasketless, metal-to-metal seals.

5. The mounting apparatus of claim 1, wherein the first housing is configured to house a display, and the second housing is configured to house electronics for the display.

6. A display head assembly comprising:
    a display;
    a plate configured to mount a source of light for the display, the plate having a first side, a second side, and a peripheral edge, the second side being opposite the first side;
    a first metal housing in direct contact with the second side of the plate to cooperatively form a first continuous seal proximate the peripheral edge;
    a second metal housing in direct contact with the first side of the plate to cooperatively form a second continuous seal proximate the peripheral edge;
    a flange extending from the first metal housing, over at least a portion of the peripheral edge, and beyond a plane of the first side of the plate, the flange being separated from the second metal housing by a gap such that the first and second seals can be formed;

at least a first fastener extending through the plate and threadably coupled to the first metal housing, the first fastener sealing the first metal housing to the plate; and at least a second fastener extending through the second metal housing and the plate and threadably coupled to the first metal housing, the second fastener sealing the second metal housing to the plate.

7. The display head assembly of claim 6, wherein the display comprises an active matrix liquid crystal display.

8. The display head assembly of claim 6, wherein the plate transfers heat from the source of light to at least one of the first and second housings via the first and second continuous seals.

9. The display head assembly of claim 6, wherein the first and second seals comprise gasketless, metal-to-metal seals.

10. The display head assembly of claim 6, wherein the first housing is configured to house the display, and the second housing is configured to house electronics for the display.

11. A mounting assembly for a display, comprising:

a plate configured to hold a source of light for a display, the plate having a first side, a second side, and a peripheral edge, the second side being opposite the first side, the plate further including a plurality of clearance holes extending through the plate from the first side to the second side;

a first housing configured to be sealingly connected to the first side of the plate;

at least one first fastener, each of the first fasteners extending through one of said clearance holes and being received by a threaded region of the first housing, the first fastener being configured to urge the plate and the first housing toward one another to form a first substantially gas-tight seal between the first housing and the plate proximate the peripheral edge;

a second housing configured to be sealingly connected to the second side of the plate, the second housing including a plurality of through holes; and at least one second fastener, each of the second fasteners extending through one of said through holes and one of said clearance holes and being received by a threaded region of the first housing, the second fastener being configured to urge the first and second housings toward one another and sandwich the plate therebetween to form a second substantially gas-tight seal between the second housing and the plate proximate the peripheral edge.

12. The mounting assembly of claim 11, wherein the first housing includes a flange extending over at least a portion of the peripheral edge and beyond a plane of the first side of the plate, the flange being separated from the second housing by a gap such that the first and second seals can be formed.

13. The mounting apparatus of claim 11, wherein the plate transfers heat from the source of light to at least one of the first and second housings via the first and second continuous seals.

14. The mounting apparatus of claim 11, wherein the plate, the first housing, and the second housing are constructed of metal.

15. The mounting apparatus of claim 14, wherein the first and second seals comprise gasketless, metal-to-metal seals.

16. The mounting apparatus of claim 11, wherein the first housing is configured to house a display, and the second housing is configured to house electronics for the display.

* * * * *